Dec. 22, 1964  J. L. GRATZMULLER  3,162,183
DEVICE FOR COOLING INTERNAL COMBUSTION MOTORS
Filed July 24, 1963  3 Sheets-Sheet 1

JEAN LOUIS GRATZMULLER
INVENTOR

By: Jacobi & Davidson
ATTORNEYS

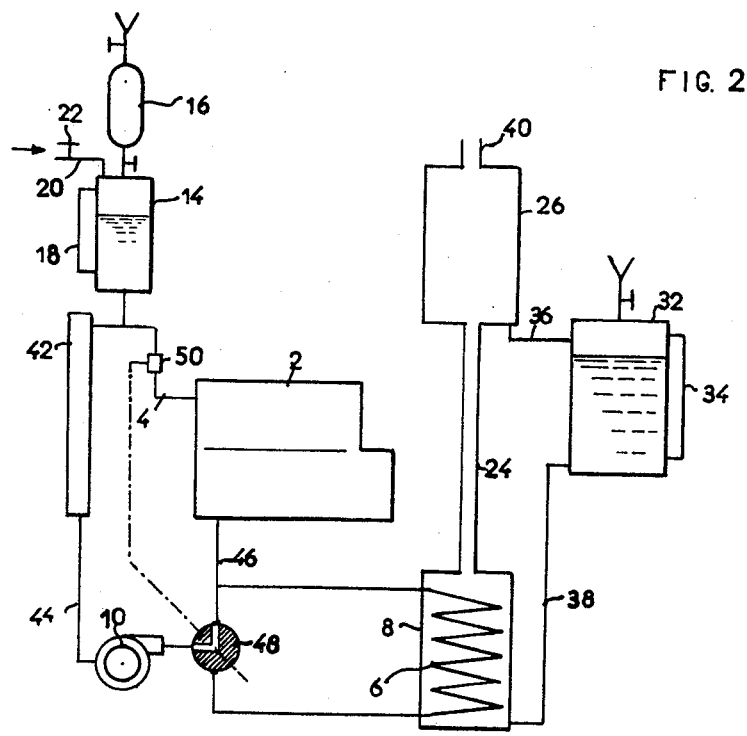

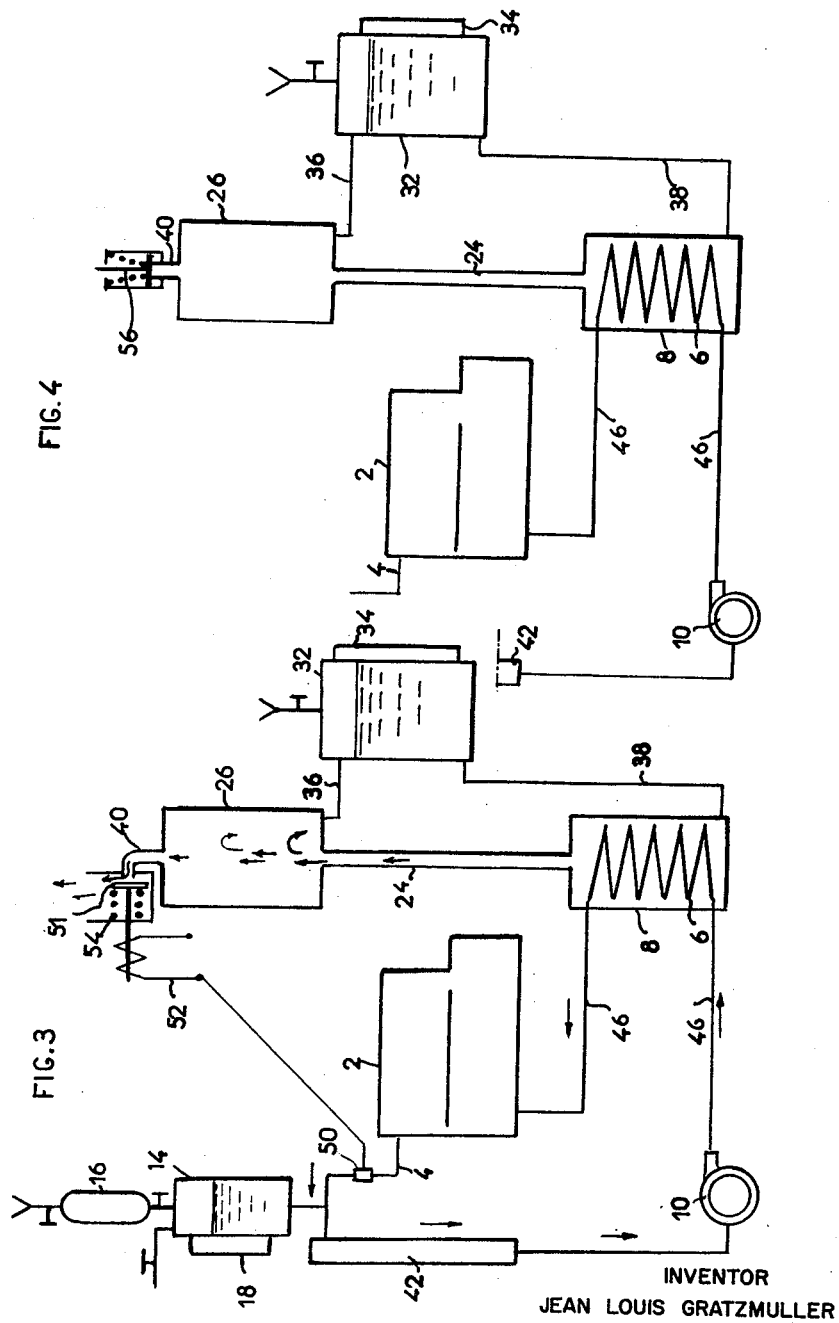

United States Patent Office 3,162,183
Patented Dec. 22, 1964

3,162,183
DEVICE FOR COOLING INTERNAL
COMBUSTION MOTORS
Jean Louis Gratzmuller, 66 Boulevard Maurice Barres,
Neuilly-sur-Seine, France
Filed July 24, 1963, Ser. No. 297,362
Claims priority, application France, Aug. 1, 1962,
905,739; Aug. 27, 1962, 907,879
15 Claims. (Cl. 123—41.08)

The instant invention deals with the water cooling of internal combustion motors.

It contemplates the improvement of water cooling and heat exchanging devices for internal combustion motors of the type in which the coolant (water) is normally maintained above its boiling point (at ambient atmospheric pressure) under pressure, notably those described in my copending U.S. patent application Serial No. 76,929, filed December 19, 1960, and entitled "Cooling Systems for Internal Combustion Engines."

In these devices, the water is maintained under an essentially constant pressure and its normal operating temperature is well above 100° C. (212 degrees F.), generally of the order of 120 degrees C. (248 degrees F.), the cooling of the water, after one cycle through the water jacket of the motor, being accomplished by passing the water through a water/air heat exchanger such as a radiator, across which air is circulated by a fan.

This method of cooling, however, presents certain disadvantages, especially when used to cool locomotive motors, and fails to insure proper cooling in certain circumstances (engine halted following a prolonged period of running at full power, passing through a tunnel, running with several locomotives in tandem, etc. . . .). In addition, the operating temperature, even when not operating within the exceptional conditions presented, is difficult to maintain at a constant value. And finally, the cooling fans of the radiators take up a sizable surface area and are often generators of excessive noise.

The devices according to the invention provide for an automatic regulation of the temperature of the water coolant during normal operation, while preventing an excessive rise in temperature during demanding periods of operation.

Heretofore, in order to avoid a dangerous rise in temperature in a locomotive power plant under demanding conditions, for example when passing through a tunnel, the best practical solution has been to spray the radiator with water, but this solution is not absolutely satisfactory as it involves an inopportune wastage of water, necessitates the use of additional manpower under generally difficult conditions, and lends itself poorly to automatic operation and to an efficacious means of control.

The invention consists of circulating the water coolant in a closed circuit being comprised of at least a circulation pump, the water jacket of the motor, means for maintaining the water coolant under pressure so as to avoid any vaporisation under normal operating conditions, the said circuit contemplaing as well as evaporation type heat exchanger fitted with a water boiler heated by the passage of the pressurized coolant through an exchange element, means being provided for feeding water into said boiler.

The evaporation type heat exchanger can be comprised of a coil which is connected to the cooling circuit of the motor and which is placed inside a boiler tank filled with water and normally vented to the atmosphere.

In one device according to the invention, the coil in communication with the cooling circuit transfers a substantial quantity of caloric energy to the water in the boiler, the evaporation of which cools the coil and consequently the water coolant in the motor's cooling circuit. The water coolant, at the contact point with the evaporation type heat exchanger, is thus sensibly maintained at the vaporization temperature of the water at atmospheric pressure, that is between 95 degrees C. and 100 degrees C. depending on the altitude and normal pressure conditions.

Following a first embodiment of the invention, the only heat exchanger in the cooling circuit is the boiler and preferably, in this case, means for condensing the vapor produced by the boiler and means as well for reintroducing the evaporation product into said boiler are provided.

Following a second embodiment of the invention, the motor cooling circuit contemplates both a water/air heat exchanger comprised of the usual radiator which is designed to dissipate the caloric energy of the motor under normal operating conditions and an evaporation type exchanger (boiler), said boiler functioning only as an auxiliary heat exchanger and being put into service, only during periods of demanding operation or when an additional cooling of the motor's coolant becomes necessary.

The connection putting the auxiliary boiler in an operative state can be effected either manually, or, if preferred, automatically by appropriate control means responding for instance, to a temperature sensitive device. In the case where the radiator is designed to maintain the water at a temperature below 100 degrees C., under normal operating conditions, no water is evaporated in the boiler. If however more demanding operating conditions present themselves, the radiator is no longer able to maintain the water below its vaporization point (100 degrees C.) and hence the water in the boiler begins to vaporize which automatically assures the desired cooling conditions in the circuit without the use of any additional control means.

In the first embodiment, in order to condense the vapor, a condenser having an air radiator is employed, but this radiator can have a surface and capacity appreciably less than those radiators used in the normal cooling circuits because the condenser acts as a heat exchanger working at a temperature above that of normal radiators.

Moreover, the boiler-condenser combination needs only to be dimensioned for normal operating conditions and not for the demanding operating conditions of relatively brief duration. In effect, when these latter conditions prevail, it is permissible for a certain amount of supplementary water to be evaporated by the boiler and not be condensed in the condenser, that is a certain amount of supplementary vapor may be lost to the atmosphere. As the liquid-liquid heat exchange in the boiler of one device following the invention is more effective than the usual water-air heat exchange, there is no danger of rapid rises in temperature and most of the above mentioned additional evaporation is easily supported by the boiler.

There is therefore realized an economy of radiators (both from the point of view of price and power consumption) and a diminution in their noise output, and moreover, an automatic regulation of the temperature is obtained.

In the second embodiment, the coil can be shunted across that part of the circuit comprised of the motor's water jacket, the circulation pump, and radiator(s) as well as the means for putting the water coolant under pressure (that part of the circuit which will hereinafter be referred to as the principal circuit in contradistinction to the additional circuit having the boiler(s) while a shunting valve permits the introduction of the additional circuit into the principal one, this valve being operated manually or automatically as thermal parameters require.

In another embodiment, the coil can be permanently incorporated into the principal cooling circuit while a valve controls the communication between the atmosphere and the water in the boiler tank in which the coil is immersed, the valve being separately controlled and being opened to permit the water in the tank to evaporate and thus to allow the operation of the auxiliary heat exchanger, should this become necessary.

The invention will be better understood from the detailed description following and an examination of the attached drawings which represent, by way of example only, various embodiments of the invention.

In the drawings:

FIGURE 2 is a schematic view of another embodiment of the invention in which the boiler provides an additional cooling action in parallel with the main cooling circuit.

FIGURE 3 is a variation of the above in which the boiler is in series with the main circuit.

FIGURE 4 is another variation on FIGURE 3.

Figure 1:
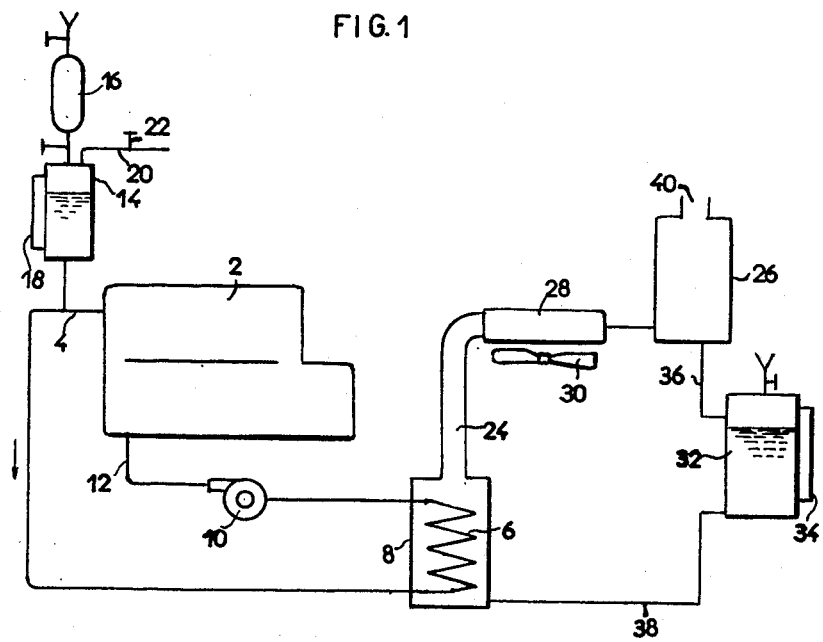
FIGURE 1 is a schematic view of a device according to the invention in which the cooling of the water circulating in the water jacket of the motor is accomplished solely by an evaporation type heat exchanger.

The water cooling circuit of an internal combustion motor 2 includes, at the opening of the motor's water jacket a pipe 4, the coil 6 of a boiler 8, a centrifugal pump 10 and a return pipe 12 to the motor.

The water is maintained under pressure by means of an auxiliary tank 14 connected to the pipe 4. A feed bottle 16 allows for the replenishment of the water in the auxiliary tank which is fitted with a visible water level gauge 18 and to which tank is fitted, at the top, a tube 20 controlled by a valve 22 for putting the tank under pressure by connecting it to a source of pressurized gas.

Following the invention, the coil 6 which cools the water circulating under pressure, is placed inside an evaporating tank or boiler 8 filled with water which has preferably been treated by some known procedure usually applied to boiler water, to avoid deposits of boiler scale or the like.

The tank 8 is fitted with a duct 24 which, at its upper end, opens into a water vapour separation chamber 26 after having passed through a condenser 28 whose radiator is fanned by a flow of air created by a fan 30. A reservoir tank 32 is placed in the auxiliary circuit between the chamber 26 and the boiler 8 and is fitted with a visible exterior water level gauge 34, the tank 32 being connected to the chamber 26 by a pipe 36 and to the boiler 8 by a pipe 38.

When the motor is running, the water, which is maintained at a pressure above that of the atmosphere and which enters the coil 6 at a temperature above 100 degrees C. transfers its caloric energy to the water held in the boiler 8 which is at atmospheric pressure, which results in a vaporization of the water in the boiler. The vapor and the water carried along by said vapor rises in the duct 24 to the condenser 28 and then the water/vapor mixture having been enriched in water content by the passage through the condenser, passes into the separating chamber 26. After separation, the condensed water returns to the reservoir 32 through the pipes 36 and the non-condensed vapor escapes to the atmosphere through vent 40.

In the most frequent case where the device is used to cool diesel locomotive motors, the rate of condensation is determined as a function of the available water reserves on board and the desired cruising radius without replenishing. In certain instances, it is even possible, without departing from the spirit of the invention, to completely eliminate the condensing stage and re-cycle only the water collected in the separator 26.

The direction of flow of the coolant in the coil 6 of the boiler 8 can be as represented in the diagram or in the opposite direction as well.

Of course, the heat exchanger using a coil is only presented as an example and can be replaced by any other evaporation type liquid/liquid heat exchanger.

The temperature of the water coolant is automatically maintained by the boiler whilst the motor is operating in the neighborhood of 100 degrees C. and the above-mentioned demanding conditions do not give rise to any sudden rise in temperature as long as the boiler 8 remains filled or is replenished with water at a rate sufficient to keep the coil 6 immersed.

In the embodiments represented by FIGURES 2, 3 and 4, the internal combustion motor 2 has a cooling circuit, whose principal component is a radiator, comprising, at the outlet of the water jacket, a pipe 4, a radiator 42, a pipe 44, a centrifugal pump 10 and a pipe 46 providing a return path to the motor.

The water coolant is maintained under pressure by a device similar to that described in connection with FIGURE 1, any convenient means for pressurizing the circuit being employed.

According to the invention, the cooling system includes an evaporation type heat-exchanger which is used, in these three embodiments, as an auxiliary heat exchanger. In the embodiment shown in FIGURE 2, the coil 6, which is placed inside an evaporating tank 8 filled with water, is connected in parallel with pipe 46, such that it is possible to connect said coil to the main circuit or to disconnect it therefrom, at will, by means of a valve having three orifices 48 controlled by a thermostatic switch 50.

The tank 8 is also fitted with a duct 24 whose upper end is enlarged to form a water/vapor separation chamber. An auxiliary reservoir 32 having an exterior, visible water level gauge 34 is connected between the chamber 26 and the tank 8, the reservoir communicating on the one hand with the chamber 26 by a pipe 36 and on the other, with the tank 8 by a pipe 38.

When the auxiliary heat exchanger is connected to the main, or principal, circuit, the water which is under a pressure above that of the atmosphere and which flows through the coil 6 at a temperature higher than 100 degrees C., causes the water in the tank 8, which is at atmospheric pressure, to boil. The mixture of vapor and water carried along with the latter rises in the duct 24 to the chamber 26 where the water and vapor are separated. The vapor escapes via vent 40 from the chamber 26 while the water returns to reservoir 32 via pipe 36.

In these embodiments schematically represented by FIGURES 3 and 4, the coil 6 of the auxiliary heat exchanger is made a permanent part of the principal circuit at pipe 46 and continuously carries the flow of water under pressure of the principal circuit. Vent 40 of chamber 26 is closed while the motor is operating under normal conditions so as not to allow the escape of vapor, whereas it opens to allow vapor to escape when demanding conditions prevail under which the water in the principal cooling circuit reaches a temperature above that calculated for normal operation of the motor.

In the embodiment shown in FIGURE 3, the opening of the vent 40 is accomplished by means of a valve 51 linked to a solenoid 52 controlled by the thermostatic device 50 which causes the valve to open automatically against the action of a spring 54 when the temperature reaches a predetermined value.

In the modification set forth in FIGURE 4, the control of the opening 40 is effected by a valve 56 adjusted to a predetermined pressure differential between the interior of the chamber 8 and the atmosphere.

In a cooling circuit of the type shown in FIGURES 3 and 4, (i.e. in those circuits having a permanent boiler 8 coil 6 in series with the remaining elements) the boiler's operation may be automatically controlled by the boiler itself, so that thermostatic or manostatic control means such as 50–51–56 can be eliminated. In order to achieve this result vent 40 is permanently held open to the atmosphere and radiator 42 is constructed in such a way as to obtain cooling parameters, during periods of normal operation, such that the water circulating in the coil 6 remains below 100 degrees C. Thus, during normal operating conditions, no water is vaporized in the boiler but should abnormal or excessive operating conditions arise, the radiator 42 can no longer keep the water's temperature below 100 degrees C. and the boiler, of its own, begins to vaporize water which insures proper cooling of the coolant without any further control systems being needed. As soon as normal operating conditions again prevail, the radiator 42 again has sufficient capacity to maintain the water at 100 degrees C. or below and the auxiliary boiler consequently ceases vaporizing water.

Of course, the invention is by no means limited to the examples described and shown which represent several possible embodiments and it is possible, without departing from the spirit of the invention, to modify the principal cooling circuit as well as the auxiliary one, the manner of connecting the one with the other, and the control means.

Thus it is possible to control the action of the auxiliary heat exchanger by adjustment of the water level in the tank and/or by controlling the flow of water into the tank. The coil can be replaced by any other equivalent device for heating water in a boiler by means of excess caloric energy of the water in the principle cooling circuit of the motor. It is possible, for instance, to use any of the classical boiler heating devices such as those wherein water to boil passes through a coil or in a cluster of boiler-tubes immersed in a tightly closed tank through which circulates the water from the principal cooling circuit.

What is claimed is:

1. A method of liquid cooling an internal combustion engine through the use of a primary closed fluid circuit and a secondary fluid circuit having at least a portion thereof open to the atmosphere, said method comprising the steps of:
   (a) circulating a cooling liquid in said primary closed circuit,
   (b) at a first location, dissipating heat from said engine by heat transfer to the liquid in said primary closed circuit,
   (c) maintaining said liquid in said primary circuit under sufficient substantially constant pressure to prevent its vaporization at temperatures thereof experienced during heat transfer thereto with normal operation of said engine;
   (d) passing the fluid in said primary closed circuit which has engine heat transferred thereto to a second location spaced from said first location;
   (e) feeding said secondary circuit with liquid, and
   (f) at said second location, dissipating heat from said fluid in said primary circuit by liquid-liquid heat exchange causing liquid in said secondary circuit to boil.

2. A liquid cooling system for cooling an internal combustion engine having a water jacket, said system comprising:
   (a) a primary liquid loop,
   (b) said loop including said water jacket, a circulation pump and means for maintaining the liquid in said loop under pressure at a value sufficient to prevent its vaporization during normal operation of said engine;
   (c) an evaporation type heat exchange means operating free of refrigeration;
   (d) said heat exchange means cooperating with said primary liquid loop to dissipate heat from liquid therein through boiling of non-refrigerated liquid in said heat exchange means, and
   (e) means for feeding liquid to said heat exchange means to be boiled therein.

3. The cooling system defined in claim 2 wherein said means for feeding liquid to said heat exchange means comprises means for condensing vapors of liquid boiled in said heat exchange means and returning the condensed vapors to said heat exchange means.

4. A liquid cooling system for cooling an internal combustion engine having a water jacket, said system comprising:
   (a) a primary liquid loop;
   (b) said primary loop including said water jacket, a circulation pump and means for maintaining the liquid in said loop under pressure at a value sufficient to prevent its vaporization during normal operation of said engine;
   (c) an evaporation type heat exchange means;
   (d) said heat exchange means cooperating with said primary loop to dissipate heat from liquid therein through boiling of liquid in said heat exchange means;
   (e) means for feeding liquid to said heat exchange means to be boiled therein; and,
   (f) said primary loop further including a liquid/gas heat exchange means for at least partially dissipating the heat from said liquid in said primary loop during normal operation of said engine.

5. The cooling system defined in claim 4 further including means for automatically directing fluid in said primary liquid loop through both said heat exchange means or only through said liquid/gas heat exchange means depending on the temperature of liquid in said primary liquid loop.

6. The cooling system defined in claim 4 wherein said evaporation type heat exchange means includes a boiler and a coil coupled in said primary loop and disposed in said boiler to be at least partially submerged in liquid in said boiler.

7. The cooling system defined in claim 6 further comprising means responsive to the temperature of said fluid in said primary loop for directing the liquid in said primary loop only through said liquid/gas heat exchange means when said temperature is below a given value and for directing the liquid in said primary loop through said liquid/gas heat exchange means and said coil when said temperature is above a given value.

8. The cooling system defined in claim 6 wherein said coil is continuously coupled in series with said water jacket, and wherein said heat exchange means further comprises an air vent, a control means including a valve means for opening and closing said air vent, and means for controlling said valve means in response to a given system condition.

9. The cooling system defined in claim 8, wherein said valve control means comprises an adjustable calibrated spring means controlling opening of said valve means at a predetermined pressure differential between said heat exchange means and the atmosphere.

10. A liquid cooling system for cooling an internal combustion engine having a water jacket, said system comprising:
    (a) a primary liquid loop;
    (b) said primary loop including said water jacket, a circulation pump and means for maintaining the liquid in said loop under pressure at a value sufficient to prevent its vaporization during normal operation of said engine;
    (c) an evaporation type heat exchange means;
    (d) said heat exchange means cooperating with said primary loop to dissipate heat from liquid therein through boiling of liquid in said heat exchange means; and,
    (e) means for feeding liquid to said heat exchange means to be boiled therein, said means for feeding comprising a liquid vapor separation chamber coupled to said heat exchange means to receive and discharge vapors therefrom and an intermediary collecting tank connected to said separation chamber and to said heat exchange means whereby liquid in said separation chamber passes into said collecting tank and then into said heat exchange means.

11. A liquid cooling system for cooling an internal combustion engine having a water jacket, said system comprising;
    (a) a primary liquid loop;

(b) said primary loop including said water jacket, a circulation pump and means for maintaining the liquid in said loop under pressure at a value sufficient to prevent its vaporization during normal operation of said engine;
(c) an evaporation type heat exchange means;
(d) said heat exchange means cooperating with said primary liquid loop to dissipate heat from liquid therein through boiling of liquid in said heat exchange means;
(e) means for feeding liquid to said heat exchange means to be boiled therein;
(f) means for at least partially condensing the vapor passing from said heat exchange means; and,
(g) means for passing said condensed liquid to said feeding means.

12. A liquid cooling system for cooling an internal combustion engine having a water jacket, said system comprising:
(a) a primary liquid loop;
(b) said primary loop including said water jacket, a circulation pump and means for maintaining the liquid in said loop under pressure at a value sufficient to prevent its vaporization during normal operation of said engine;
(c) an evaporation type heat exchange means comprising a boiler and a coil immersed in a liquid in said heat exchange means;
(d) said heat exchange means cooperating with said primary liquid loop with said coil connected in said loop to dissipate heat from liquid therein through boiling of liquid in said heat exchange means;
(e) means for feeding liquid to said heat exchange means to be boiled therein, said means for feeding comprising means for condensing vapors of liquid boiled in said heat exchange means and returning the condensed vapors to said heat exchange means;
(f) chamber means disposed in connecting relation to said boiler for collection of liquid therein and passage of vapor therethrough, said chamber means having an atmospheric vent therein allowing passage of vapor to the atmosphere; and,
(g) a collecting tank disposed in connecting relation to said chamber means and said boiler for storing and feeding liquid from said chamber means to said boiler.

13. A liquid cooling system for cooling an internal combustion engine having a water jacket, said system comprising;
(a) a primary liquid loop;
(b) said primary loop including said water jacket, a circulation pump and means for maintaining the liquid in said loop under substantially constant pressure at a value sufficient to prevent its vaporization during normal operation of said engine;
(c) an evaporation type heat exchange means;
(d) said heat exchange means cooperating with said primary liquid loop to dissipate heat from liquid therein through boiling of liquid under a pressure less than said value in said heat exchange means; and
(e) means for feeding liquid to said heat exchange means to be boiled therein.

14. A liquid cooling system as defined in claim 13 wherein said liquid in said heat exchange means is water.

15. A liquid cooling system for cooling an internal combustion engine having a water jacket, said system comprising:
(a) a primary liquid loop;
(b) said primary loop including said water jacket, a circulation pump and means for maintaining the liquid in said loop under pressure at a value sufficient to prevent its vaporization during normal operation of said engine;
(c) an evaporation type heat exchange means;
(d) said heat exchange means cooperating with said primary liquid loop to dissipate heat from liquid therein through boiling of liquid under atmospheric pressure in said heat exchange means;
(e) means for feeding liquid to said heat exchange means to be boiled therein, said means for feeding comprising a liquid/vapor separation chamber coupled to said heat exchange means to receive and discharge vapors therefrom and an intermediary collecting tank connected to said separation chamber and to said heat exchange means whereby liquid in said separation chamber passes into said collecting tank and then into said heat exchange means.

References Cited by the Examiner
UNITED STATES PATENTS

| | | | |
|---|---|---|---|
| 1,767,598 | 6/30 | Mallory | 123—41.1 |
| 2,277,113 | 3/42 | Kimmel | 123—41.08 |
| 2,776,648 | 1/57 | Taylor | 123—41.19 |

KARL J. ALBRECHT, *Primary Examiner.*